(12) United States Patent
Zhao et al.

(10) Patent No.: US 12,106,025 B2
(45) Date of Patent: Oct. 1, 2024

(54) METHOD FOR DESIGNING SQUEEZED BRANCH PILE BASED ON ORTHOGONAL DESIGN AND FINITE ELEMENT ANALYSIS

(71) Applicant: Shijiazhuang Tiedao University, Shijiazhuang (CN)

(72) Inventors: Cunbao Zhao, Shijiazhuang (CN); Ziqi Wang, Shijiazhuang (CN); Wenyue Zhang, Shijiazhuang (CN)

(73) Assignee: Shijiazhuang Tiedao University, Shijiazhuang (CN)

( * ) Notice: Subject to any disclaimer, the term of this patent is extended or adjusted under 35 U.S.C. 154(b) by 0 days.

(21) Appl. No.: 18/634,303

(22) Filed: Apr. 12, 2024

(65) Prior Publication Data
US 2024/0265172 A1 Aug. 8, 2024

Related U.S. Application Data

(63) Continuation of application No. PCT/CN2023/094506, filed on May 16, 2023.

(30) Foreign Application Priority Data

Jun. 10, 2022 (CN) .......................... 202210654400.9

(51) Int. Cl.
*G06F 30/23* (2020.01)
*G06F 30/13* (2020.01)
*G06F 111/10* (2020.01)

(52) U.S. Cl.
CPC .............. *G06F 30/23* (2020.01); *G06F 30/13* (2020.01); *G06F 2111/10* (2020.01)

(58) Field of Classification Search
CPC .......... G06F 30/00; G06F 30/23; G06F 30/20; G06F 30/13; G06F 2111/10; G06F 2119/14
USPC ............................................................ 703/6
See application file for complete search history.

(56) References Cited

FOREIGN PATENT DOCUMENTS

| CN | 105868474 A | | 8/2016 |
|---|---|---|---|
| CN | 206205788 U | * | 5/2017 |
| CN | 109726486 A | | 5/2019 |

(Continued)

OTHER PUBLICATIONS

Zhang, Minxia et al., "Bearing Behavior and Failure Mechanism of Squeezed Branch Piles", Jun. 23, 2018, Journal of Rock Mechanics and Geotechnical Engineering 10, Elsevier B.V. (Year: 2018).*

(Continued)

*Primary Examiner* — Cedric Johnson
(74) *Attorney, Agent, or Firm* — AP3 Law Firm PLLC (57) ABSTRACT

A method includes: designing an orthogonal design table of four factors and three levels, and obtaining nine groups of structural parameters; performing a numerical simulation calculation through a finite element software to obtain nine groups of simulation results, and recording in the orthogonal design table; determining a first design parameter based on the vertical bearing performance according to the nine groups of simulation results; determining a second design parameter based on economic efficiency; and determining a design parameter according to the first design parameter and the second design parameter, and designing the squeezed branch pile according to the design parameter.

6 Claims, 9 Drawing Sheets

(56) References Cited

FOREIGN PATENT DOCUMENTS

CN 111680353 A * 9/2020
CN 114218801 A 3/2022

OTHER PUBLICATIONS

DeHong, Wang et al., "Field Test and Numerical Simulation on Bearing Capacity of Squeezed Branch Pile in Transmission Line", 2017, Mechanika, vol. 23 (5). (Year: 2017).*
Wang, Ziqi et al.., "Multi-Objective Design and Optimization of Squeezed Branch Pile based on Orthogonal Test", Dec. 2023, Scientific Reports. (Year: 2023).*
Guo, Jing, "Research on Optimization Design of Extruded and Expanded Branch Piles", Engineering Science and Technology II, China Master's Thesis Full-Text Database, No. 6, Jun. 15, 2017, 76 pages.

* cited by examiner

METHOD FOR DESIGNING SQUEEZED BRANCH PILE BASED ON ORTHOGONAL DESIGN AND FINITE ELEMENT ANALYSIS

CROSS-REFERENCE TO RELATED APPLICATIONS

This application is a continuation of International Application No. PCT/CN2023/094506, filed on May 16, 2023 and entitled "method for designing squeezed branch pile based on orthogonal design and finite element analysis", which claims priority to Chinese Patent Application No. 202210654400.9, filed on Jun. 10, 2022 and entitled "method for designing squeezed branch pile based on orthogonal design and finite element analysis". The disclosures of the aforementioned applications are hereby incorporated by reference in their entireties.

TECHNICAL FIELD

The disclosure relates to the technical field of building pile foundation, and in particular to a method for designing a squeezed branch pile based on orthogonal design and finite element analysis.

BACKGROUND

Squeezed branch pile is a novel pile foundation formed on the basis of a straight hole pile, and the additional expansion plate on the pile body can effectively improve the bearing capacity and reduce the settlement deformation of the pile body under loading. The application prospects of the squeezed branch pile in engineering fields such as super-high-rise buildings, heavy-haul railways, and transmission line construction are very broad.

In recent years, many scholars have studied the bearing capacity characteristics (vertical bearing performance) of the squeezed branch pile by field test, indoor simulated test and finite element analysis. Due to the existence of the branch plate, the force situation of the soil around the squeezed branch pile becomes more complex, resulting in complex influence factors of field test and difficulty to control accurately. Although the results of field test have a high confidence, the cost is too high to conduct a systematic research, and some of the results are not representative. Moreover, there are many influence factors affecting the bearing capacity and deformation performance of the squeezed branch pile, and it is very difficult to conduct extensive and systematic researches through field test.

SUMMARY

These and other problems are generally solved or circumvented, and technical advantages are generally achieved, by embodiments of the present disclosure which provide a method for designing a squeezed branch pile based on orthogonal design and finite element analysis.

Technical Problems

The purpose of the present application is to provide a method for designing a squeezed branch pile based on orthogonal design and finite element analysis to solve the above problems in field test.

Technical Solutions

To solve the above problems, the application adopts the following technical solution:

A method for designing a squeezed branch pile based on orthogonal design and finite element analysis includes the following step (1) to step (5).

Step (1), designing an orthogonal design table of four factors and three levels according to an optimization target, and obtaining nine groups of structural parameters corresponding respectively to nine groups of simulated squeezed branch piles according to the orthogonal design table, where the four factors include a quantity of branch plates, a diameter of the branch plates, a squeezed angle of the branch plates and a distance between adjacent branch plates of the branch plates, and the optimization target is a vertical bearing performance of the nine groups of simulated squeezed branch piles, the four factors and the three levels indicating each of the four factors having three different values, and each of the nine groups of structural parameters comprising a combination of values of the four factors.

Step (2), performing a numerical simulation calculation through a finite element software based on simulated soil parameters and the nine groups of structural parameters to obtain nine groups of simulation results indicating vertical settlements of the nine groups of simulated squeezed branch piles, and recording the nine groups of simulation results in the orthogonal design table, the simulated soil parameters representing features of soils in which the squeezed branch pile is to be used.

Step (3), determining a first design parameter of the nine groups of simulated squeezed branch piles based on vertical bearing performance according to the nine groups of simulation results, the vertical bearing performance being based on the vertical settlements of the nine groups of simulated squeezed branch piles, and the first design parameter comprising a first combination of values of the four factors.

Step (4), determining a second design parameter of the nine groups of simulated squeezed branch piles based on economic efficiencies of simulated squeezed branch piles corresponding to the first design parameter and the nine groups of structural parameters, the economic efficiencies of the simulated squeezed branch piles based on loading settlements of the simulated squeezed branch piles, and the second design parameter comprising a second combination of values of the four factors. And Step (5), determining a design parameter based on the first design parameter and the second design parameter, the design parameter comprising a combination of values of the four factors, and designing the squeezed branch pile according to the design parameter.

As an embodiment of the present application, the step (2) includes the following step (201) to step (204).

Step (201), obtaining the simulated soil parameters, where the simulated soil parameters are obtained using a preliminary geotechnical test.

Step (202), inputting the simulated soil parameters and the nine groups of structural parameters into the finite element software for simulating, to obtain nine simulated assembly soil-piles.

Step (203), performing simulation by using a ¼ simulation in numerical simulation according to a symmetry principle, and applying a same static loading to a pile top of each of the nine simulated assembly soil-piles for performing the numerical simulation calculation, to obtain the nine groups of simulation results of vertical settlement in different working conditions. And Step (204), recording the nine groups of simulation results in the orthogonal design table.

As an embodiment of the present application, the step (3) includes the following step (301) to step (302).

Step (301), performing a variance analysis on the nine groups of simulation results to obtain a mean value and a range of a vertical settlement corresponding to each level of each of the four factors. And Step (302), obtaining a level value corresponding to a minimum mean of the vertical settlement for each factor of the four factors based on the mean value and the range of the vertical settlement corresponding to each level of each of the four factors, and obtaining the first design parameter of the nine groups of simulated squeezed branch piles.

As an embodiment of the present application, the step (4) includes the following step (401) to step (402).

Step (401), performing, according to ten groups of test schemes, a vertical loading performance test on ten simulated squeezed branch piles by applying loadings of different weights to the ten simulated squeezed branch piles, to obtain ten groups of loading settlements, the ten simulated squeezed branch piles corresponding, respectively, to the first design parameter and the nine groups of structural parameters, each group of loading settlements corresponding to the structural parameters of one group of simulated squeezed branch piles. And Step (402), obtaining ten loading settlement curves according to the ten groups of loading settlements, and obtaining the second design parameter based on the economic efficiencies obtained according to the ten loading settlement curves, the ten loading settlement curves representing a relationship of loading settlements and loadings.

As an embodiment of the present application, the step (402) includes the following step (4021) to step (4025).

Step (4021), obtaining the ten loading settlement curves in a two-dimensional coordinate system according to the ten groups of loading settlements.

Step (4022), adding a linear function y=a to the two-dimensional coordinate system, a being a maximum loading settlement value of a loading settlement curve corresponding to the first design parameter.

Step (4023), taking abscissas of intersections of the linear function y=a with nine loading settlement curves corresponding to the nine groups of simulated squeezed branch piles as ultimate bearing capacities of the nine groups of simulated squeezed branch piles, respectively, the ultimate bearing capacities being bearable weights of loadings.

Step (4024), obtaining bearing capacities per unit volume of the nine groups of simulated squeezed branch piles according to the ultimate bearing capacities and volumes of the nine groups of simulated squeezed branch piles, and recording the bearing capacities per unit volume of the nine groups of simulated squeezed branch piles in the orthogonal design table, the bearing capacities per unit volume being bearable weights of loadings per unit volume. And Step (4025), obtaining the second design parameter based on the economic efficiencies and the bearing capacities per unit volume of the nine groups of simulated squeezed branch piles.

As an embodiment of the present application, the step (4025) includes the following steps:

Performing a variance analysis on the bearing capacities per unit volume of the nine groups of simulated squeezed branch piles to obtain a mean value and a range of the bearing capacities per unit volume corresponding to each level of each factor; obtaining a level parameter value corresponding to a maximum mean value of the bearing capacities per unit volume under each factor based on the mean value and the range of the bearing capacities per unit volume corresponding to each level of each factor, and obtaining the second design parameter based on the economic efficiencies.

As an embodiment of the present application, the step (5) includes:

Determining the first design parameter or the second design parameter as the design parameter when the first design parameter is consistent with the second design parameter, and designing the squeezed branch pile based on the design parameter.

As an embodiment of the present application, the step (5) includes the following steps:

Determining a weighting value of the vertical bearing performance and a weighting value of the economic efficiencies according to engineering actual needs when the first design parameter is not consistent with the second design parameter.

Determining the first design parameter as the design parameter when determining that the weighting value of the vertical bearing performance is greater than or equal to the weighting value of the economic efficiencies; or determining the second design parameter as the design parameter when determining that the weighting value of the vertical bearing performance is less than the weighting value of the economic efficiencies. And Designing the squeezed branch pile according to the design parameter.

As an embodiment of the present application, the method further includes:

Performing an axial loadings analysis on the squeezed branch pile designed according to the design parameter, and providing a guidance for practical installation of the squeezed branch pile in engineering.

Advantageous Effects of the Disclosure

The technical solution of the present disclosure has the following advantageous effects:

In the method for designing squeezed branch pile based on orthogonal design and finite element analysis provided by present application, the orthogonal design of four factors and three levels is designed, in which the four factors include a quantity of branch plates, a diameter of the branch plates, a squeezed angle of the branch plates and a distance between adjacent branch plates of the branch plates. The observation index includes the bearing performance and economic efficiencies of the squeezed branch pile. The material parameters of the squeezed branch pile and the soil are set, respectively. The numerical simulation calculation is performed by using finite element software and the simulation data of each simulated squeezed branch pile is extracted. The obtained simulation data is filled into an orthogonal design table for performing orthogonal design to obtain the design parameter having an optimal bearing capacity and/or an optimal economic efficiency. Finally, an axial loadings analysis on the squeezed branch pile corresponding to the design parameter is performed to obtain a bearing law of the squeezed branch pile, which may provide certain experience for practical engineering.

The present application uses a method combining finite element analysis and orthogonal design to design the structural of the squeezed branch pile. The method provided by the application is simple, and the result is scientific and effective, which provides accurate and efficient guidance for structural design of the squeezed branch pile.

DETAILED DESCRIPTION OF ILLUSTRATIVE EMBODIMENTS

In order to make the purpose, technical solution and advantages of the present application clearer, the present application is clearly and completely described below in combination with specific embodiments and drawings.

Figure 1:
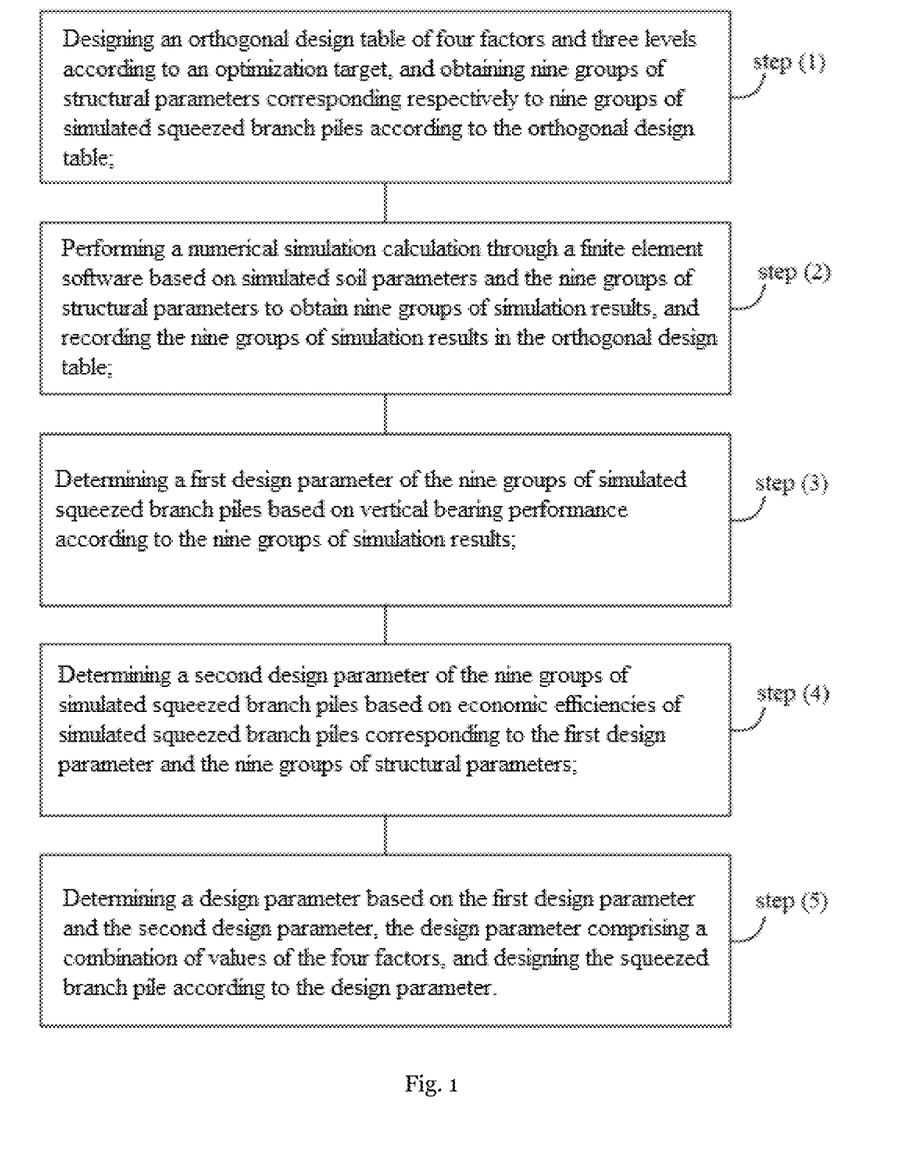
FIG. 1 is a flow chart of a method for designing a squeezed branch pile based on orthogonal design and finite element analysis provided by an embodiment of the present disclosure.

The embodiment of the present application provides a method for designing a squeezed branch pile based on orthogonal design and finite element analysis. As shown in FIG. 1, the method includes the following step (1) to step (5).

Step (1), designing an orthogonal design table of four factors and three levels according to an optimization target, and obtaining nine groups of structural parameters corresponding respectively to nine groups of simulated squeezed branch piles according to the orthogonal design table, where the four factors comprise a quantity of branch plates, a diameter of the branch plates, a squeezed angle of the branch plates and a distance between adjacent branch plates of the branch plates, and the optimization target is a vertical bearing performance of the nine groups of simulated squeezed branch piles.

Where the level values corresponding to each factor may be determined according to actual requirements. In the present application, the diameter (D) of the simulated squeezed branch pile is 30 millimeters (mm), and the length of the simulated squeezed branch pile is 600 mm. The following level values for each factor are selected.

A quantity of the branch plates is respectively set to 2, 3 and 4; the diameters of the branch plates are respectively set to 1.5D (that is 45 mm), 2D and 2.5D; the squeezed angles of the branch plates are respectively set to 35°, 40° and 45°; and the spacings between the branch plates are respectively set to 2D, 2.5D and 3D.

Before making the orthogonal design table, a factors-levels table shown in Table 1 is prepared according to the described factors and level values.

TABLE 1

Factors-levels table (D is the diameter of the simulated squeezed branch piles)

| | Factors | | | |
|---|---|---|---|---|
| Levels | Quantity | Diameter | Squeezed angle | Spacing |
| 1 | 2 | 1.5 D | 35° | 2 D |
| 2 | 3 | 2 D | 40° | 2.5 D |
| 3 | 4 | 2.5 D | 45° | 3 D |

An orthogonal experimental combination is determined according to the factors-levels table, and the orthogonal design table as shown in Table 2 is generated.

TABLE 2

Orthogonal design table $L_9 (3^4)$

| | Factors | | | |
|---|---|---|---|---|
| Number | Quantity | Diameter | Squeezed angle | Spacing |
| 1 | 2 | 1.5 D | 35° | 2 D |
| 2 | 2 | 2 D | 40° | 2.5 D |
| 3 | 2 | 2.5 D | 45° | 3 D |
| 4 | 3 | 1.5 D | 40° | 3 D |
| 5 | 3 | 2 D | 45° | 2 D |
| 6 | 3 | 2.5 D | 35° | 2.5 D |
| 7 | 4 | 1.5 D | 45° | 2.5 D |
| 8 | 4 | 2 D | 35° | 3 D |
| 9 | 4 | 2.5 D | 40° | 2 D |

Thus, the nine groups of structural parameters of nine groups of simulated squeezed branch piles can be obtained according to the orthogonal design table, and the values of the number of the branch plates, the diameters of the branch plates, the squeezed angles of the branch plates and the spacings between the branch plates can be selected from the values in experiment numbers 1 to 9 in Table 2 correspondingly. The embedding depth of each simulated squeezed branch pile may be determined according to three pieces of data, in which the three pieces of data are respectively the number of the branch plates (determining the number of data of the embedding depth of the branch plates in Table 3), the spacing between the branch plates (determining a difference value of data between embedding depth of the adjacent branch plates in Table 3), and the position of the branch plate closest to the bottom of the simulated squeezed branch pile (all the positions of the branch plates closest to the bottom of the simulated squeezed branch piles are the same, i.e. −400 mm, that is, the branch plate closest to the bottom of the simulated squeezed branch pile is located 400 mm below the soil surface), as shown in Table 3.

TABLE 3

Structural parameters of simulated squeezed branch piles

| Number | Length/ mm | Effective length/ mm | Diameter of piles/ mm | Diameter/ mm | Quantity | Squeezed angle/° | Spacing/ mm | Depth of branch plates/ mm |
|---|---|---|---|---|---|---|---|---|
| 1 | 600 | 500 | 30 | 45 | 2 | 35 | 60 | −340, −400 |
| 2 | 600 | 500 | 30 | 60 | 2 | 40 | 75 | −325, −400 |
| 3 | 600 | 500 | 30 | 75 | 2 | 45 | 90 | −310, −400 |
| 4 | 600 | 500 | 30 | 45 | 3 | 40 | 90 | −220, −310, −400 |
| 5 | 600 | 500 | 30 | 60 | 3 | 45 | 60 | −280, −340, −400 |
| 6 | 600 | 500 | 30 | 75 | 3 | 35 | 75 | −250, −325, −400 |
| 7 | 600 | 500 | 30 | 45 | 4 | 45 | 75 | −175, −250, −325, −400 |
| 8 | 600 | 500 | 30 | 60 | 4 | 35 | 90 | −130, −220, −310, −400 |
| 9 | 600 | 500 | 30 | 75 | 4 | 40 | 60 | −220, −280, −340, −400 |

Step (2), performing a numerical simulation calculation through a finite element software based on simulated soil parameters and the nine groups of structural parameters of the nine groups of simulated squeezed branch piles to obtain nine groups of simulation results indicating vertical settlements of the nine groups of simulated squeezed branch piles, and recording the nine groups of simulation results in the orthogonal design table, the simulated soil parameters representing features of soils in which the squeezed branch pile is to be used.

Step (2) specifically includes the following step (201) to step (204).

Step (201), obtaining the simulated soil parameters, where the simulated soil parameters are obtained using a preliminary geotechnical test.

For example, the simulated soil parameters obtained by geotechnical test are shown in Table 4.

TABLE 4

Simulated soil parameters

| Items | Density (p)/ (g · cm$^{-3}$) | Specific gravity of soil (ds) | Water content (w)/% | Cohesion (c)/ kPa | Internal friction angle (φ)/° | Compression modulus (Es)/ MPa | Poisson's ratio (μ) |
|---|---|---|---|---|---|---|---|
| clay | 2.1845 | 2.75 | 14.70 | 6.365 | 29.362 | 2.353 | 0.3 |

Step (202), inputting the simulated soil parameters and the nine groups of structural parameters of the nine groups of simulated squeezed branch piles according to the orthogonal design table into the finite element software for simulating, to obtain nine simulated assembly soil-piles.

Figure 2:
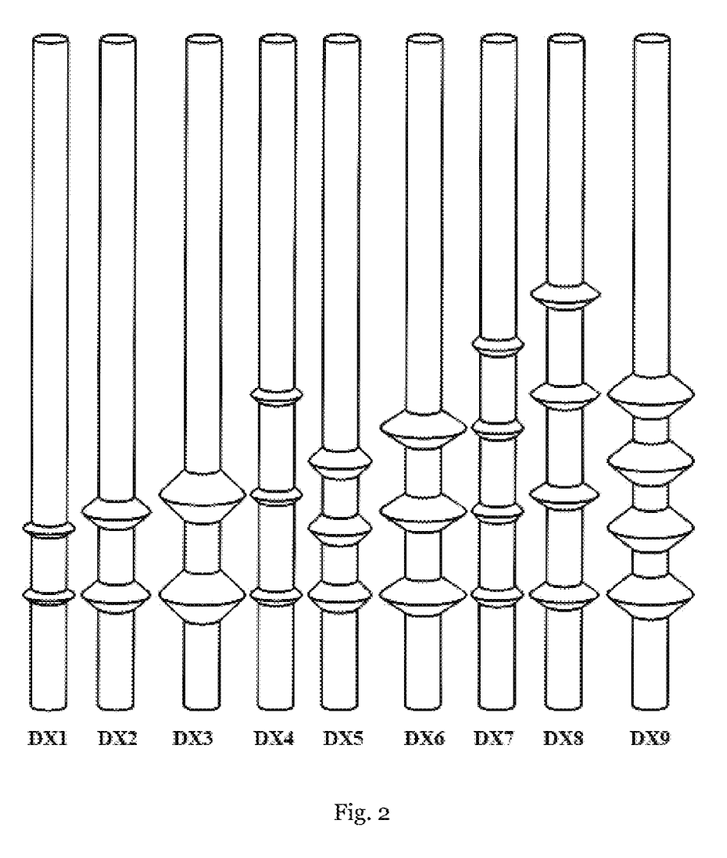
FIG. 2 is a schematic structural diagram of nine groups of simulated squeezed branch piles with different parameters provided by an embodiment of the present disclosure.
Figure 3:
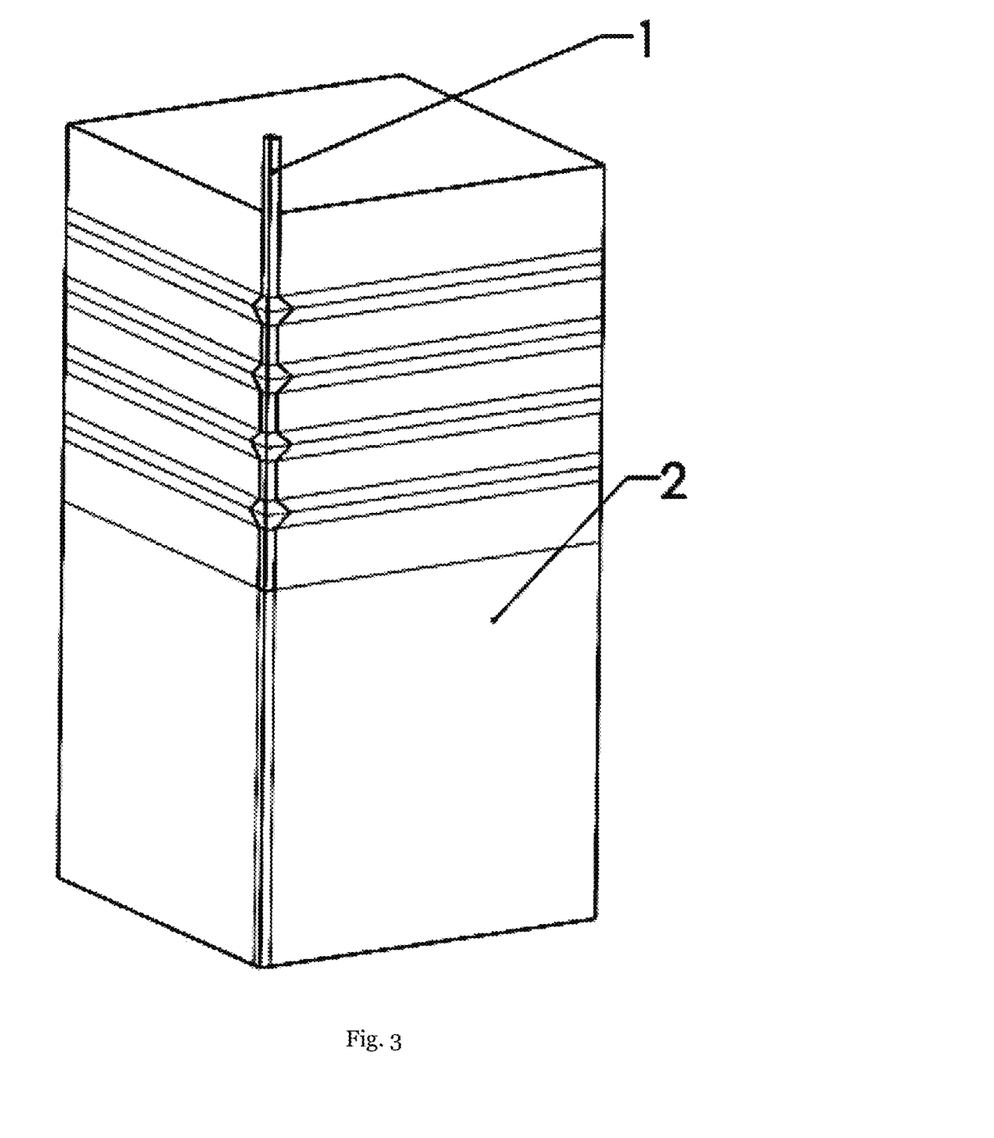
FIG. 3 is a simulated diagram of a ¼ loading adopted in numerical simulation provided by an embodiment of the present disclosure.

The finite element software may be ABAQUS, in which, first, the simulated squeezed branch piles DX1-DX9 (as shown in FIG. 2) and the simulated soil are established according to the nine groups of structure parameters in Table 3 and the simulated soil parameters in Table 4, respectively, then each of the nine groups of simulated squeezed branch piles and the simulated soil are assembled into a whole, respectively, so as to obtain nine simulated assembly soil-piles. FIG. 3 shows a schematic view of a simulated assembly soil-pile (with numeral 1: simulated squeezed branch pile, numeral 2: simulated soil).

Step (203), performing simulation by using a ¼ simulation in numerical simulation according to a symmetry principle, and applying a same static loading to a pile top of each of the nine simulated assembly soil-piles for performing the numerical simulation calculation, to obtain the nine groups of simulation results of vertical settlement in different working conditions.

Step (204), recording the nine groups of simulation results in the orthogonal design table.

In one possible implementation, the nine groups of simulation results are recorded in the orthogonal design table to obtain the factors and levels of bearing performance as in Table 5.

TABLE 5

Factors and levels of bearing performance

| Number | Quantity | Diameter | Squeezed angle | Spacing | Vertical settlement (mm) |
|---|---|---|---|---|---|
| 1 | 2 | 1.5 D | 35° | 2 D | 4.8973 |
| 2 | 2 | 2 D | 40° | 2.5 D | 2.6372 |
| 3 | 2 | 2.5 D | 45° | 3 D | 1.8271 |
| 4 | 3 | 1.5 D | 40° | 3 D | 3.5574 |
| 5 | 3 | 2 D | 45° | 2 D | 2.4388 |
| 6 | 3 | 2.5 D | 35° | 2.5 D | 1.1712 |
| 7 | 4 | 1.5 D | 45° | 2.5 D | 3.3416 |
| 8 | 4 | 2 D | 35° | 3 D | 1.2945 |
| 9 | 4 | 2.5 D | 40° | 2 D | 1.1726 |

Step (3), determining a first design parameter of the nine groups of simulated squeezed branch piles based on vertical bearing performance according to the nine groups of simulation results. The vertical bearing performance being based on the vertical settlements of the nine groups of simulated squeezed branch piles, and the first design parameter comprising a first combination of values of the four factors.

Step (3) specifically includes the following step (301) to step (302).

Figure 4:
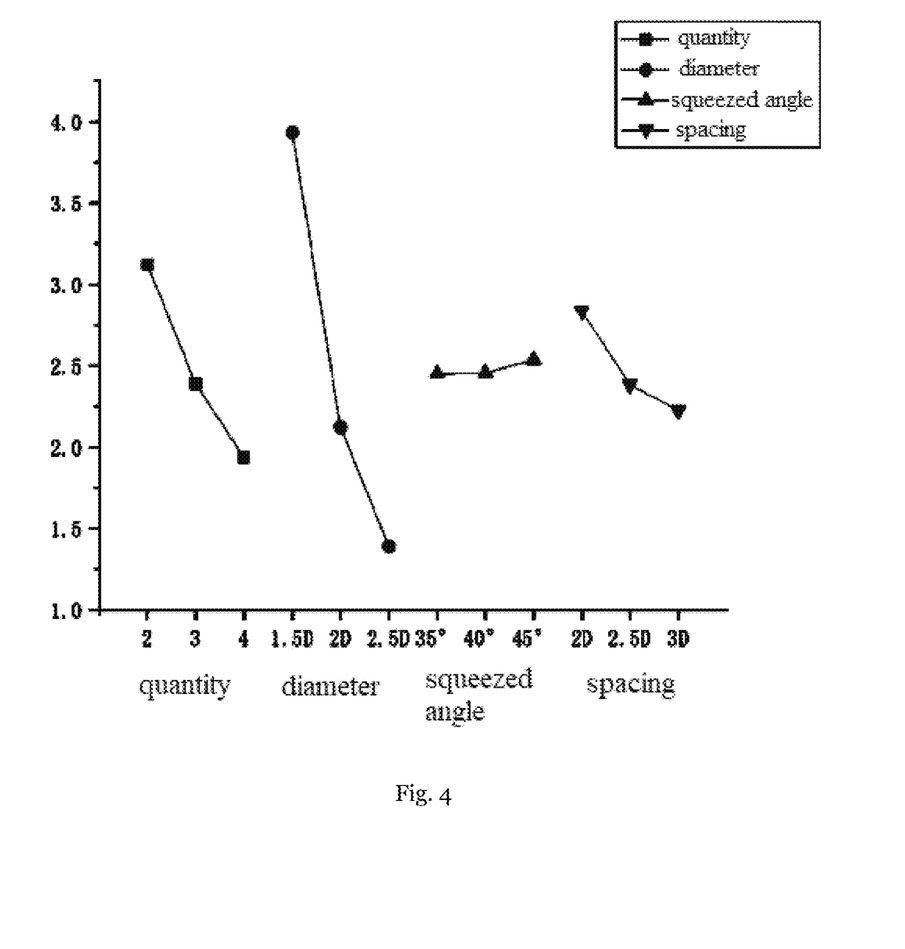
FIG. 4 is a diagram of bearing performance effect curves provided by an embodiment of the present disclosure, y axis representing mean values of vertical settlements (unit being millimeters)

Step (301), performing a variance analysis on the nine groups of simulation results to obtain a mean value and a range of a vertical settlement corresponding to each level of each of the four factors as shown in Table 6, and drawing a bearing performance effect curve graph as shown in FIG. 4 to analyze the calculation results visually.

Then the influence degree of the optimization variables selected by each optimization target on the optimization target are sorted by combining the mean value and the range of factors and levels of bearing performance in Table 6 and the bearing performance effect curve graph in FIG. 4, and an optimal experiment solution of each optimization target based on the vertical bearing performance can be obtained.

TABLE 6

Mean value and range based on bearing performance

| Number | Quantity | Diameter | Squeezed angle | Spacing | Vertical settlement(mm) |
|---|---|---|---|---|---|
| 1 | 2 | 1.5 D | 35° | 2 D | 4.8973 |
| 2 | 2 | 2 D | 40° | 2.5 D | 2.6372 |
| 3 | 2 | 2.5 D | 45° | 3 D | 1.8271 |
| 4 | 3 | 1.5 D | 40° | 3 D | 3.5574 |
| 5 | 3 | 2 D | 45° | 2 D | 2.4388 |
| 6 | 3 | 2.5 D | 35° | 2.5 D | 1.1712 |
| 7 | 4 | 1.5 D | 45° | 2.5 D | 3.3416 |
| 8 | 4 | 2 D | 35° | 3 D | 1.2945 |
| 9 | 4 | 2.5 D | 40° | 2 D | 1.1726 |
| K1 | 3.121 | 3.932 | 2.454 | 2.836 | |
| K2 | 2.389 | 2.124 | 2.456 | 2.383 | |
| K3 | 1.936 | 1.390 | 2.536 | 2.226 | |
| R | 1.185 | 2.542 | 0.082 | 0.610 | |

In Table 6, numeral 3.121 is the mean value of the vertical settlement corresponding to the number of branch plates of 2, and similarly numeral 2.389 to numeral 1.936 are successively the mean values of the vertical settlement corresponding to the number of branch plates of 3 to 4. Numeral 1.185 is a range of the vertical settlement corresponding to the number of the branch plates. Numeral 3.932 to numeral 2.124 to numeral 1.390 are successively the mean values of the vertical settlement corresponding to the diameters of the branch plates of 1.5D to 2D to 2.5D. Numeral 2.542 is a range of the vertical settlement corresponding to the diameters of the branch plates. Numeral 2.454 to numeral 2.456 to numeral 2.536 are successively the mean values of the vertical settlement corresponding to the squeezed angles of the branch plates of 35° to 40° to 45°. Numeral 0.082 is a range of the vertical settlement corresponding to the squeezed angles of the branch plates. Numeral 2.836 to numeral 2.383 to numeral 2.226 are successively the mean values of vertical settlement corresponding to the spacings of the branch plates of 2D to 2.5D to 3D, and numeral 0.610 is a range of the vertical settlement corresponding to the spacings of the branch plates.

Step (302), obtaining a level value corresponding to a minimum mean of the vertical settlement for each factor of the four factors based on the mean value and the range of the vertical settlement corresponding to each level of each of the four factors, and obtaining the first design parameter of the nine groups of simulated squeezed branch piles.

According to Table 6 and FIG. 4, it can be seen that the order of influence of various factors on the vertical settlement of the simulated squeezed branch piles ranging from large to small is: the diameter of the branch plates, the number of the branch plates, the distance between adjacent branch plates of the branch plates, and the squeezed angle of the branch plates.

Through orthogonal design analysis, it can be obtained that the first combination of values of the four factors is the number of the branch plates being four, the diameter of the branch plate being 2.5D, the squeezed angle of the branch plate being 35°, and the spacing of the branch plate being 3D, that is, the best way to reduce the vertical settlement of the simulated squeezed branch pile is adopting the first combination of values of the four factors. And the first combination of values of the four factors is the first design parameter of the nine groups of simulated squeezed branch piles based on the vertical bearing performance.

Step (4), determining a second design parameter of the nine groups of simulated squeezed branch piles based on economic efficiencies of simulated squeezed branch piles corresponding to the first design parameter and the nine groups of structural parameters, the economic efficiencies of the simulated squeezed branch piles based on loading settlements of the simulated squeezed branch piles, and the second design parameter comprising a second combination of values of the four factors.

Step (4) specifically includes the following step (401) to step (402).

Step (401), performing, according to ten groups of test schemes, a vertical loading performance test on ten simulated squeezed branch piles by applying loadings of different weights to the ten simulated squeezed branch piles, to obtain ten groups of loading settlements, the ten simulated squeezed branch piles corresponding, respectively, to the first design parameter and the nine groups of structural parameters, each group of loading settlements corresponding to the structural parameters of one group of simulated squeezed branch piles.

The simulated squeezed branch pile (DX10) based on the first design parameter is loaded with the same working condition as the nine groups of simulated squeezed branch piles (DX1-DX9) for a vertical loading performance test to obtain loading settlements. The loading settlements are compared with that of the nine groups, and the loading settlements of each simulated squeezed branch pile shown in Table 7 is collated and produced.

according to the ultimate bearing capacities and volumes of the nine groups of simulated squeezed branch piles, and recording the bearing capacities per unit volume (unit bearing capacity) of the nine groups of simulated squeezed branch piles in the orthogonal

TABLE 7

Loading settlements of each simulated squeezed branch pile

| Q/N | Mode 1 type | | | | | | | | | |
|---|---|---|---|---|---|---|---|---|---|---|
| | DX1 | DX2 | DX3 | DX4 | DX5 | DX6 | DX7 | DX8 | DX9 | DX10 |
| | | | | | s/mm | | | | | |
| 200 | 0.0486 | 0.0303 | 0.0232 | 0.0286 | 0.0248 | 0.0167 | 0.0250 | 0.0639 | 0.0162 | 0.0139 |
| 400 | 0.1826 | 0.0752 | 0.0521 | 0.0596 | 0.0577 | 0.0379 | 0.0526 | 0.08355 | 0.0327 | 0.0277 |
| 600 | 0.4700 | 0.2946 | 0.1242 | 0.2416 | 0.2114 | 0.0939 | 0.1834 | 0.1241 | 0.0664 | 0.0501 |
| 800 | 0.8303 | 0.4677 | 0.3240 | 0.4637 | 0.3891 | 0.1921 | 0.3830 | 0.2092 | 0.1738 | 0.0882 |
| 1000 | 1.3931 | 0.8113 | 0.4490 | 0.8812 | 0.7084 | 0.2964 | 0.7390 | 0.3326 | 0.2695 | 0.1984 |
| 1200 | 2.0083 | 1.0888 | 0.7030 | 1.2958 | 0.9599 | 0.4432 | 1.1555 | 0.4837 | 0.4310 | 0.3010 |
| 1400 | 2.6550 | 1.4678 | 0.9047 | 1.8463 | 1.3324 | 0.5815 | 1.6775 | 0.6712 | 0.5604 | 0.4272 |
| 1600 | 3.2755 | 1.8170 | 1.2076 | 2.3741 | 1.6553 | 0.7861 | 2.1977 | 0.8596 | 0.7836 | 0.5500 |
| 1800 | 3.9762 | 2.2389 | 1.4702 | 2.9819 | 2.0653 | 0.9487 | 2.7867 | 1.0759 | 0.9273 | 0.7096 |
| 2000 | 4.8973 | 2.6372 | 1.8271 | 3.5574 | 2.4389 | 1.1712 | 3.3416 | 1.2945 | 1.1726 | 0.8527 |

Step (402), obtaining ten loading settlement curves according to the ten groups of loading settlements, and obtaining the second design parameter based on the economic efficiencies obtained according to the ten loading settlement curves, the ten loading settlement curves representing a relationship of loading settlements and loadings.

Step (402) specifically includes the following step (4021) to step (4025).

Step (4021), obtaining the ten loading settlement curves in a two-dimensional coordinate system according to the ten groups of loading settlements.

Figure 5:
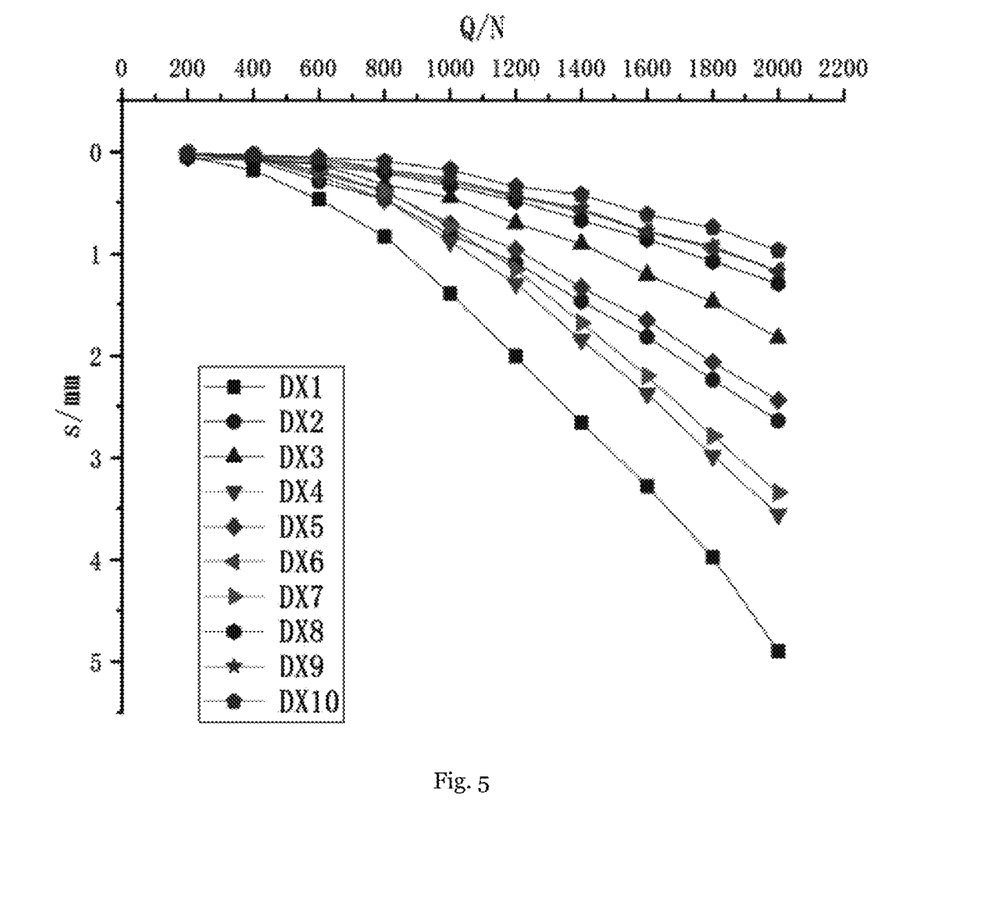
FIG. 5 is a diagram of the loading settlement curves provided by an embodiment of the present disclosure, x axis representing weights of loadings, abbreviated as "Q" and the unit being Newton, y axis representing loading settlements, abbreviated as "S" and the unit being millimeters.

Ten loading settlement curves (Q-s) can be plotted according to the ten groups of loading settlements in the above Table 7, as shown in FIG. 5. And the ten loading settlement curves may be obtained by the software of origin.

In addition, a comprehensive analysis of Table 7 and FIG. 5 concludes that the simulated squeezed branch pile (DX10) based on the first design parameter has the minimum loading settlement value under the same weight of loadings, and has the high vertical bearing performance, which further verifies the correctness and scientificity of the orthogonal design.

Step (4022), adding a linear function y=a to the two-dimensional coordinate system, a being a maximum loading settlement value of a loading settlement curve corresponding to the first design parameter.

In the present application, a is used as a standard to determine the ultimate bearing capacity of each squeezed branch pile. It can be seen from Table 7 and FIG. 5 that a is the loading settlement value of 0.8527 generated by DX10 under 2000 Newton (N) of loadings, therefore, a linear function F1: y=0.8527 is added, as shown in FIG. 6.

Step (4023), taking abscissas of intersections of the linear function y=a with nine loading settlement curves corresponding to the nine groups of simulated squeezed branch piles as ultimate bearing capacities of the nine groups of simulated squeezed branch piles, respectively, the ultimate bearing capacities being bearable weights of loadings by a simulated squeezed branch pile.

Step (4024), obtaining bearing capacities per unit volume of the nine groups of simulated squeezed branch piles design table, the bearing capacities per unit volume being bearable weights of loadings per unit volume.

Figure 6:
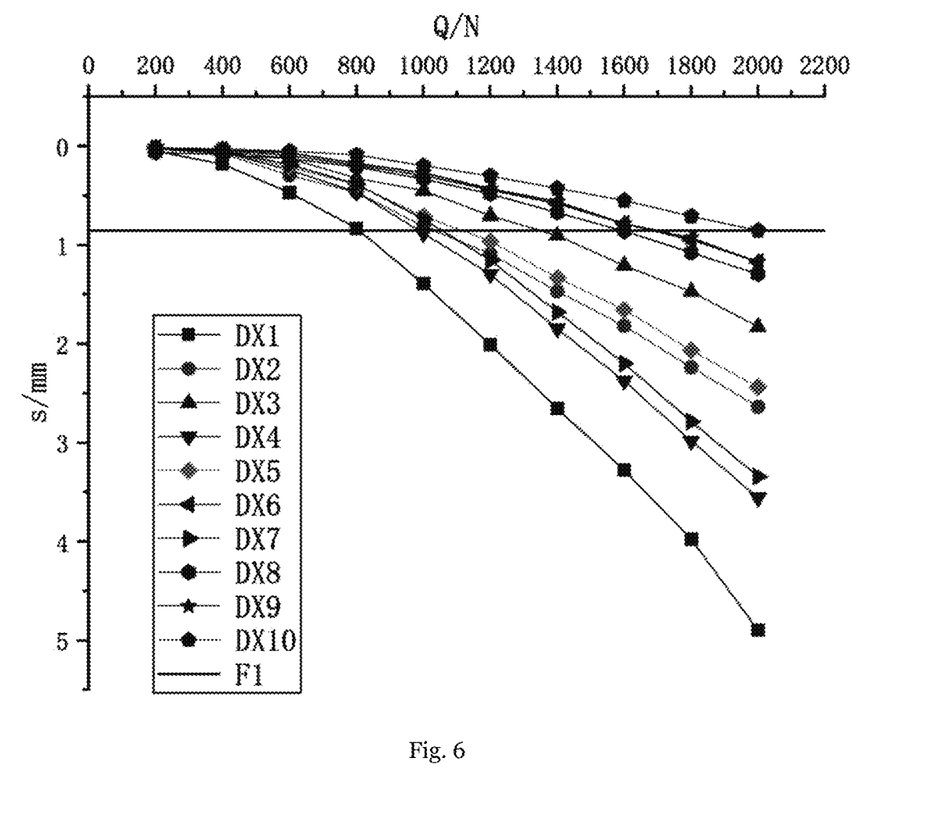
FIG. 6 is a schematic diagram of adding a linear function y=a in FIG. 5, x axis representing weights of loadings, abbreviated as "Q" and the unit being Newton, y axis representing loading settlements, abbreviated as "S" and the unit being millimeters.

The unit bearing capacity values of the simulated piles obtained according to FIG. 6 are shown in Table 8.

TABLE 8

Bearing capacity per unit volume of each simulated pile

| Simulated piles | Ultimate bearing capacity/N | Volume/ $cm^3$ | Bearing capacity per unit volume/N |
|---|---|---|---|
| DX1 | 807.9644 | 432.78 | 1.8669 |
| DX2 | 1029.8474 | 471.56 | 2.1839 |
| DX3 | 1348.4038 | 567.25 | 2.3771 |
| DX4 | 986.3407 | 439.68 | 2.2433 |
| DX5 | 1114.7265 | 480.57 | 2.3196 |
| DX6 | 1681.9576 | 574.46 | 2.9279 |
| DX7 | 1054.5901 | 448.54 | 2.3512 |
| DX8 | 1592.7238 | 503.31 | 3.1645 |
| DX9 | 1696.1735 | 664.33 | 2.5532 |

Step (4025), obtaining the second design parameter based on the economic efficiencies and the bearing capacities per unit volume of the nine groups of simulated squeezed branch piles.

Step (4025) specifically includes:

The unit bearing capacity values of the nine groups of simulated squeezed branch piles of DX1 to DX9 are filled in the orthogonal design table for the calculation of economic efficiencies to obtain the mean value and range of the unit bearing capacity corresponding to each factor and level of the economic efficiencies shown in Table 9.

TABLE 9

Mean value and range based on economic efficiencies

| Number | Quantity | Diameter | Squeezed angle | Spacing | Bearing capacity per unit volume (N) |
|---|---|---|---|---|---|
| 1 | 2 | 1.5 D | 35° | 2 D | 1.8669 |
| 2 | 2 | 2 D | 40° | 2.5 D | 2.1839 |
| 3 | 2 | 2.5 D | 45° | 3 D | 2.3771 |
| 4 | 3 | 1.5 D | 40° | 3 D | 2.2433 |
| 5 | 3 | 2 D | 45° | 2 D | 2.3196 |

TABLE 9-continued

Mean value and range based on economic efficiencies

| Number | Quantity | Diameter | Squeezed angle | Spacing | Bearing capacity per unit volume (N) |
|---|---|---|---|---|---|
| 6 | 3 | 2.5 D | 35° | 2.5 D | 2.9279 |
| 7 | 4 | 1.5 D | 45° | 2.5 D | 2.3512 |
| 8 | 4 | 2 D | 35° | 3 D | 3.1645 |
| 9 | 4 | 2.5 D | 40° | 2 D | 2.5532 |
| K1 | 2.143 | 2.154 | 2.653 | 2.247 | |
| K2 | 2.497 | 2.556 | 2.327 | 2.488 | |
| K3 | 2.690 | 2.619 | 2.349 | 2.595 | |
| R | 0.547 | 0.465 | 0.326 | 0.348 | |

Figure 7:
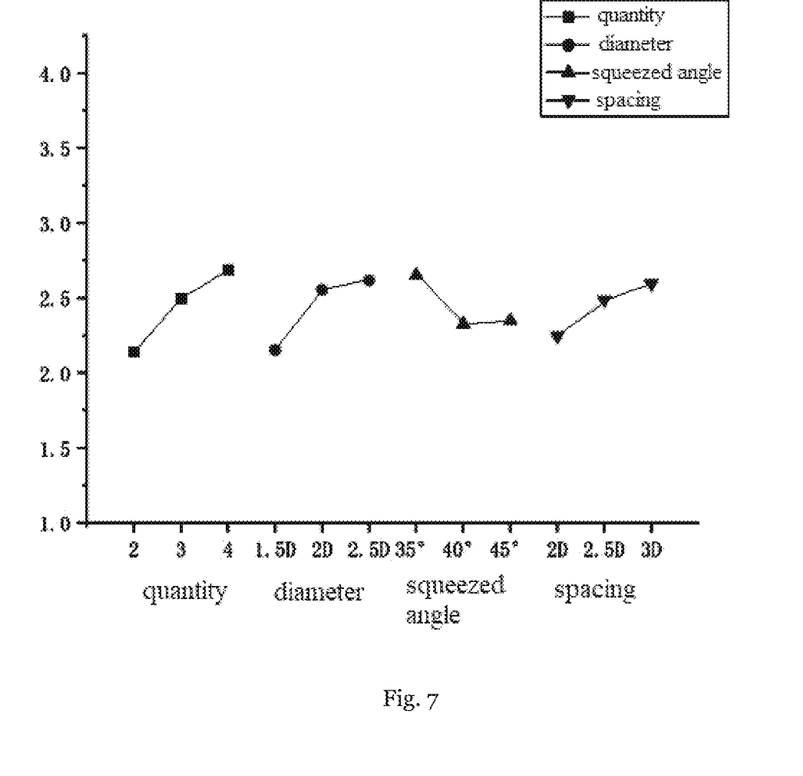
FIG. 7 is a diagram of the economic efficiency curves provided by an embodiment of the present disclosure, y axis representing mean values of bearing capacities per unit volume.

According to the mean value and range of the unit bearing capacity corresponding to each factor and level of the economic efficiencies shown in Table 9, a primary and secondary order of influence of various factors on the bearing capacity per unit volume of the nine groups of simulated squeezed branch piles is obtained, and an economic efficiency effect curve graph as shown in FIG. 7 is drawn; and it can be seen from analysis of a calculation result that the primary and secondary order of influence of four factors is: the number of branch plates, the diameter of the branch plates, the distance between adjacent branch plates, and the squeezed angle of the branch plate in descending order.

Through Table 9 and FIG. 7, the second combination of values of the four factors based on the economic efficiencies can be obtained as the number of branch plates being 4, the diameter of the branch plate being 2.5D, the squeezed angle of the branch plate being 35°, and the spacing of the branch plate being 3D. The simulated squeezed branch pile with the largest bearing capacity per unit volume may be designed through the above parameters, that is, the simulated squeezed branch pile with the best economic efficiencies. The above second combination of values of the four factors are the second design parameter of the nine groups of simulated squeezed branch piles based on the economic efficiencies.

Of course, the present application also verifies the described simulated squeezed branch pile with the optimal economic efficiencies.

In the present application, the simulated squeezed branch pile designed based on the design parameters of the number of branch plates being 4, the diameter of the branch plate being 2.5D, the squeezed angle of the branch plate being 35°, and the spacing of the branch plate being 3D is DX10. It can be seen from step (4022) that the abscissa of intersection of the linear function y=0.8527 with the loading settlement curve of DX10 is 2000 N. The bearing capacity per unit volume of DX10 simulated pile is shown in Table 10, and it can be seen from the comparison of Table 10 and Table 8 that DX10 is the simulated squeezed branch pile with the best economic efficiencies.

TABLE 10

Bearing capacity per unit volume of DX10

| Simulated pile | Ultimate bearing capacity/N | Volume/cm³ | Bearing capacity per unit volume/N |
|---|---|---|---|
| DX10 | 2000 | 624.51 | 3.2025 |

Step (5), determining a design parameter based on the first design parameter and the second design parameter, and designing the squeezed branch pile according to the design parameter.

According to whether the first design parameter is consistent with the second design parameter, the design parameter comprising a combination of values of the four factors, and designing the squeezed branch pile according to the design parameter, the acquisition of the design parameter may be classified into the following two manners.

(1) determining the first design parameter or the second design parameter as the design parameter when the first design parameter is consistent with the second design parameter, and designing the squeezed branch pile according to the design parameter.

As described above, the parameters combination of values of the four factors of the second design parameter in the present embodiment is the same as those of DX10 with the optimal bearing performance. DX10 has the optimal combination of factors and levels in both bearing performance and economic efficiencies.

(2) determining a weighting value of the vertical bearing performance and a weighting value of the economic efficiencies according to engineering actual needs when the first design parameter is not consistent with the second design parameter.

Determining the first design parameter as the design parameter when determining that the weighting value of the vertical bearing performance is greater than or equal to the weighting value of the economic efficiencies; or determining the second design parameter as the design parameter when determining that the weighting value of the vertical bearing performance is less than the weighting value of the economic efficiencies.

Where the weighting value of the vertical bearing performance and the weighting value of the economic efficiencies may be determined in advance by a designer according to requirements.

In a possible implementation, the method further includes the following step (6).

Performing an axial loadings analysis on the squeezed branch pile designed according to the design parameter, and providing a guidance for practical installation of the squeezed branch pile in engineering.

The main difference between the squeezed branch pile and the straight hole pile is that under the action of external loading, the branch plates of the squeezed branch pile can resist the action of external loading together with the pile body by providing additional bearing capacity. In order to explore the specific bearing law of the squeezed branch pile with the design parameter, the axial loadings analysis of the aforementioned DX10 with the best bearing performance and economic efficiencies is carried out, and the loading transfer mechanism of DX10 is obtained.

Figure 8:
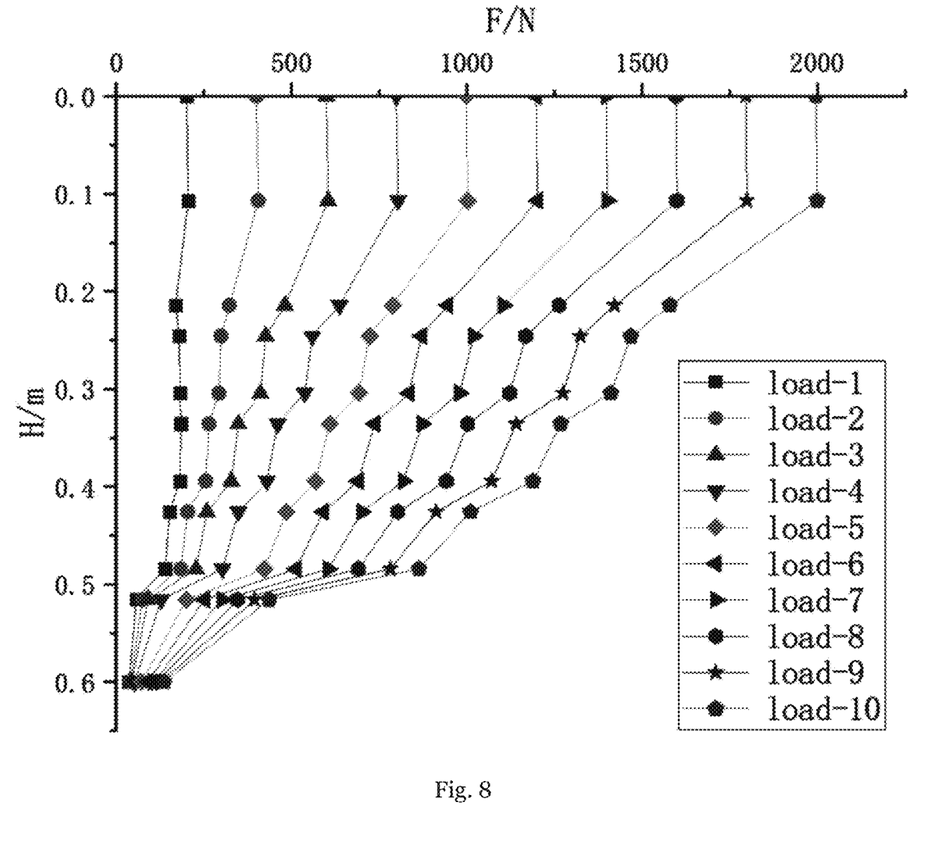
FIG. 8 is a diagram of the axial loadings transmission curves of DX10 provided by an embodiment of present disclosure, x axis representing axial loadings, abbreviated as "F" and the unit being Newton, y axis representing depths of squeezed branch piles, abbreviated as "H" and the unit being meters.

The axial loadings transmission curves of DX10 in FIG. 8 show that the axial loadings of the pile body of the squeezed branch pile gradually decreases with the increase of depth, which is similar to the axial loadings characteristics of the pile body of the straight hole pile, but different from the straight hole pile, the axial loadings of the pile body of the squeezed branch pile changes significantly at the interface between the upper and lower parts of the branch plate. (where load-1 to load-10 are external loadings in increments of 200 N).

The decreased axial loadings are distributed on the branch plate and further distributed on the soil below the lower inclined plane of the branch plate. With the increase of the loading, the axial loadings of the pile body at the branch plate is reduced more and more greatly, which is a characteristic of the bearing loadings of the squeezed branch pile, and is also a reason for a high bearing loadings of the squeezed branch pile.

Figure 9:
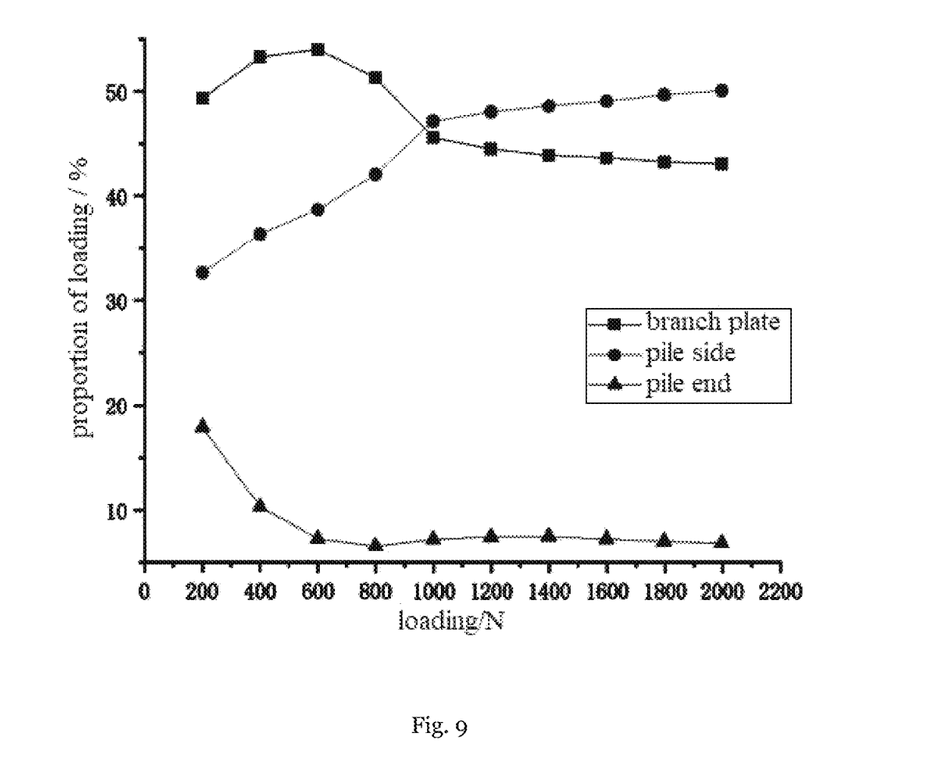
FIG. 9 is a diagram of the loading distribution curves of DX10 provided by an embodiment of present disclosure.

The axial loadings distribution of each part of the squeezed branch pile is extracted in the software ABAQUS, and the loading distribution curves of DX10 in FIG. 9 is produced. It can be seen from FIG. 9 that in the entire loading stage, the loading distribution on all branch plates is always 43% to 55%, which indicates that the axial loadings distribution on all branch plates is a large part of the whole squeezed branch pile. Among all the branch plates, the branch plate closest to the end of the squeezed branch pile has the largest bearing ratio; therefore, the selection of the position thereof is particularly important, and in practical engineering, it is preferred to arrange same in a high-quality soil layer so as to provide a larger bearing loading. The soil below the branch plate is squeezed, so that the effect of the piling side friction force between the branch plates is greatly improved. The axial loadings distribution on the piling side friction force is improved along with the increase of the external loading, rising from 32% to about 50%, which plays an important role in improving the bearing capacity of a single squeezed branch pile.

What is claimed is:

1. A method for designing a squeezed branch pile, comprising:

step (1), designing an orthogonal design table of four factors and three levels according to an optimization target, and obtaining nine groups of structural parameters corresponding respectively to nine groups of simulated squeezed branch piles according to the orthogonal design table, wherein the four factors comprise a quantity of branch plates, a diameter of the branch plates, a squeezed angle of the branch plates and a distance between adjacent branch plates of the branch plates, and the optimization target is a vertical bearing performance of the nine groups of simulated squeezed branch piles, the four factors and the three levels indicating each of the four factors having three different values, and each of the nine groups of structural parameters comprising a combination of values of the four factors;

step (2), performing a numerical simulation calculation through a finite element software based on simulated soil parameters and the nine groups of structural parameters, to obtain nine groups of simulation results indicating vertical settlements of the nine groups of simulated squeezed branch piles, and recording the nine groups of simulation results in the orthogonal design table, the simulated soil parameters representing features of soils in which the squeezed branch pile is to be used;

step (3), determining a first design parameter of the nine groups of simulated squeezed branch piles based on vertical bearing performance according to the nine groups of simulation results, the vertical bearing performance being based on the vertical settlements of the nine groups of simulated squeezed branch piles, and the first design parameter comprising a first combination of values of the four factors;

step (4), determining a second design parameter of the nine groups of simulated squeezed branch piles based on economic efficiencies of simulated squeezed branch piles corresponding to the first design parameter and the nine groups of structural parameters, the economic efficiencies of the simulated squeezed branch piles based on loading settlements of the simulated squeezed branch piles, and the second design parameter comprising a second combination of values of the four factors; and step (5), determining a design parameter based on the first design parameter and the second design parameter, the design parameter comprising a combination of values of the four factors, and designing the squeezed branch pile according to the design parameter; and the step (3) comprises:

step (301), performing a variance analysis on the nine groups of simulation results to obtain a mean value and a range of a vertical settlement corresponding to each level of each of the four factors; and step (302), obtaining a level value corresponding to a minimum mean of the vertical settlement for each factor of the four factors based on the mean value and the range of the vertical settlement corresponding to each level of each of the four factors, and obtaining the first design parameter of the nine groups of simulated squeezed branch piles;

the step (4) comprises:

step (401), performing, according to ten groups of test schemes, a vertical loading performance test on ten simulated squeezed branch piles by applying loadings of different weights to the ten simulated squeezed branch piles, to obtain ten groups of loading settlements, the ten simulated squeezed branch piles corresponding, respectively, to the first design parameter and the nine groups of structural parameters; and step (402), obtaining ten loading settlement curves according to the ten groups of loading settlements, and obtaining the second design parameter based on the economic efficiencies obtained according to the ten loading settlement curves, the ten loading settlement curves representing a relationship of loading settlements and loadings; and the step (402) comprises:

step (4021), obtaining the ten loading settlement curves in a two-dimensional coordinate system according to the ten groups of loading settlements;

step (4022), adding a linear function y=a to the two-dimensional coordinate system, a being a maximum loading settlement value of a loading settlement curve corresponding to the first design parameter;

step (4023), taking abscissas of intersections of the linear function y=a with nine loading settlement curves corresponding to the nine groups of simulated squeezed branch piles as ultimate bearing capacities of the nine groups of simulated squeezed branch piles, respectively, the ultimate bearing capacities being bearable weights of loadings;

step (4024), obtaining bearing capacities per unit volume of the nine groups of simulated squeezed branch piles according to the ultimate bearing capacities and volumes of the nine groups of simulated squeezed branch piles, and recording the bearing capacities per unit volume of the nine groups of simulated squeezed branch piles in the orthogonal design table, the bearing capacities per unit volume being bearable weights of loadings per unit volume; and step (4025), obtaining the second design parameter based on the economic efficiencies and the bearing capacities per unit volume of the nine groups of simulated squeezed branch piles.

2. The method according to claim 1, wherein the step (2) comprises:
step (201), obtaining the simulated soil parameters, wherein the simulated soil parameters are obtained using a preliminary geotechnical test;
step (202), inputting the simulated soil parameters and the nine groups of structural parameters into the finite element software for simulating, to obtain nine simulated assembly soil-piles;
step (203), performing simulation by using a ¼ simulation in numerical simulation according to a symmetry principle, and applying a same static loading to a pile top of each of the nine simulated assembly soil-piles for performing the numerical simulation calculation, to obtain the nine groups of simulation results of vertical settlement in different working conditions, and
step (204), recording the nine groups of simulation results in the orthogonal design table.

3. The method according to claim 1, wherein the step (4025) comprises:
performing a variance analysis on the bearing capacities per unit volume of the nine groups of simulated squeezed branch piles to obtain a mean value and a range of bearing capacities per unit volume corresponding to each level of each factor; and
obtaining a level parameter value corresponding to a maximum mean value of the bearing capacities per unit volume under each factor based on the mean value and the range of the bearing capacities per unit volume corresponding to each level of each factor, and obtaining the second design parameter based on the economic efficiencies.

4. The method according to claim 1, wherein the step (5) comprises:
determining the first design parameter or the second design parameter as the design parameter when the first design parameter is consistent with the second design parameter.

5. The method according to claim 4, wherein the step (5) comprises:
determining a weighting value of the vertical bearing performance and a weighting value of the economic efficiencies according to engineering actual needs when the first design parameter is not consistent with the second design parameter; and
determining the first design parameter as the design parameter when determining that the weighting value of the vertical bearing performance is greater than or equal to the weighting value of the economic efficiencies; or determining the second design parameter as the design parameter when determining that the weighting value of the vertical bearing performance is less than the weighting value of the economic efficiencies.

6. The method according to claim 1, further comprising:
performing an axial loadings analysis on the squeezed branch pile designed according to the design parameter, and providing a guidance for practical installation of the squeezed branch pile in engineering.

\* \* \* \* \*